United States Patent
Sako

(10) Patent No.: US 8,976,389 B2
(45) Date of Patent: Mar. 10, 2015

(54) PRINTING APPARATUS FOR TRANSMITTING INFORMATION PRINTING METHOD THEREOF, AND STORAGE MEDIUM

(75) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/593,170

(22) Filed: Aug. 23, 2012

(65) Prior Publication Data

US 2013/0050753 A1 Feb. 28, 2013

(30) Foreign Application Priority Data

Aug. 26, 2011 (JP) .................. 2011-184619

(51) Int. Cl.
*G06F 3/12* (2006.01)
*H04N 1/00* (2006.01)

(52) U.S. Cl.
CPC .......... *H04N 1/00233* (2013.01); *G06F 3/1285* (2013.01); *G06F 3/1204* (2013.01); *G06F 3/1226* (2013.01); *G06F 3/1268* (2013.01); *G06F 3/122* (2013.01); *G06F 3/1228* (2013.01); *G06F 3/1247* (2013.01); *H04N 2201/0094* (2013.01)
USPC ........... 358/1.15; 358/1.1; 709/206; 370/381; 455/412.1

(58) Field of Classification Search
None
See application file for complete search history.

(56) References Cited

U.S. PATENT DOCUMENTS

| | | | | | |
|---|---|---|---|---|---|
| 6,980,319 | B2 * | 12/2005 | Ohta | ............................ | 358/1.18 |
| 7,280,537 | B2 * | 10/2007 | Roy | ............................... | 370/381 |
| 7,441,003 | B1 * | 10/2008 | Takeda et al. | .................. | 709/206 |
| 2002/0002592 | A1 * | 1/2002 | Aoki et al. | ..................... | 709/211 |

FOREIGN PATENT DOCUMENTS

JP 2009-184292 A 8/2009

* cited by examiner

*Primary Examiner* — Paul F Payer
(74) *Attorney, Agent, or Firm* — Canon U.S.A., Inc., IP Division

(57) ABSTRACT

A printing apparatus receives a transmission request of information to be used by an information processing apparatus to transmit an image to the printing apparatus via an image processing apparatus from the information processing apparatus including the image. The printing apparatus transmits the information to the information processing apparatus if the transmission request is received. Then, the printing apparatus acquires the image that the information processing apparatus transmits using the information and prints the acquired image.

6 Claims, 15 Drawing Sheets

FIG. 10

| ATTRIBUTE | VALUE | |
|---|---|---|
| Name | printer_kaihatsu1 | ~1000 |
| Pdl | JPEG, TIFF | ~1001 |
| Color | True | ~1002 |
| Duplex | False | ~1003 |
| EmailAddress | printer_kaihatsu1@xxx.canon.co.jp | ~1004 |

PRINTING APPARATUS FOR TRANSMITTING INFORMATION PRINTING METHOD THEREOF, AND STORAGE MEDIUM

BACKGROUND OF THE INVENTION

1. Field of the Invention

The present invention relates to a printing apparatus, a printing method, and a storage medium.

2. Description of the Related Art

Japanese Patent Application Laid-Open No. 2009-184292 discusses a technique in which electronic data is printed using electronic mail. In Japanese Patent Application Laid-Open No. 2009-184292, electronic data such as an image to be printed is attached to electronic mail, and the electronic mail is transmitted to an electronic mail address corresponding to a printing apparatus. The printing apparatus receives the electronic mail via a mail server which receives the electronic mail and prints the received electronic data.

In the system discussed in Japanese Patent Application Laid-Open No. 2009-184292, a user inputs an electronic-mail address to an information processing apparatus such as a mobile terminal to send the electronic mail. It is troublesome for the user to manually input the electronic-mail address (in other words, information used for transmitting electronic data such as images to the printing apparatus).

SUMMARY OF THE INVENTION

The present invention relates to a printing apparatus which transmits information used for transmitting electronic data to the printing apparatus to an information processing apparatus.

According to an aspect of the present invention, a printing apparatus includes a reception unit configured to receive a transmission request of information to be used by an information processing apparatus to transmit an image to the printing apparatus via an image processing apparatus from the information processing apparatus including the image, a transmission unit configured to transmit the information to the information processing apparatus if the reception unit receives the transmission request, and a printing unit configured to acquire the image that the information processing apparatus transmits using the information and print the acquired image.

The printing apparatus according to the present invention transmits information to be used for transmitting electronic data to the printing apparatus to a processing apparatus, accordingly troublesomeness for a user operating an information processing apparatus to manually input the information can be reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an example of information about each attribute included in a print-service search response transmitted by the printing device in the printing system according to the first exemplary embodiment.

DESCRIPTION OF THE EMBODIMENTS

Various exemplary embodiments, features, and aspects of the invention will be described in detail below with reference to the drawings.

Figure 1:
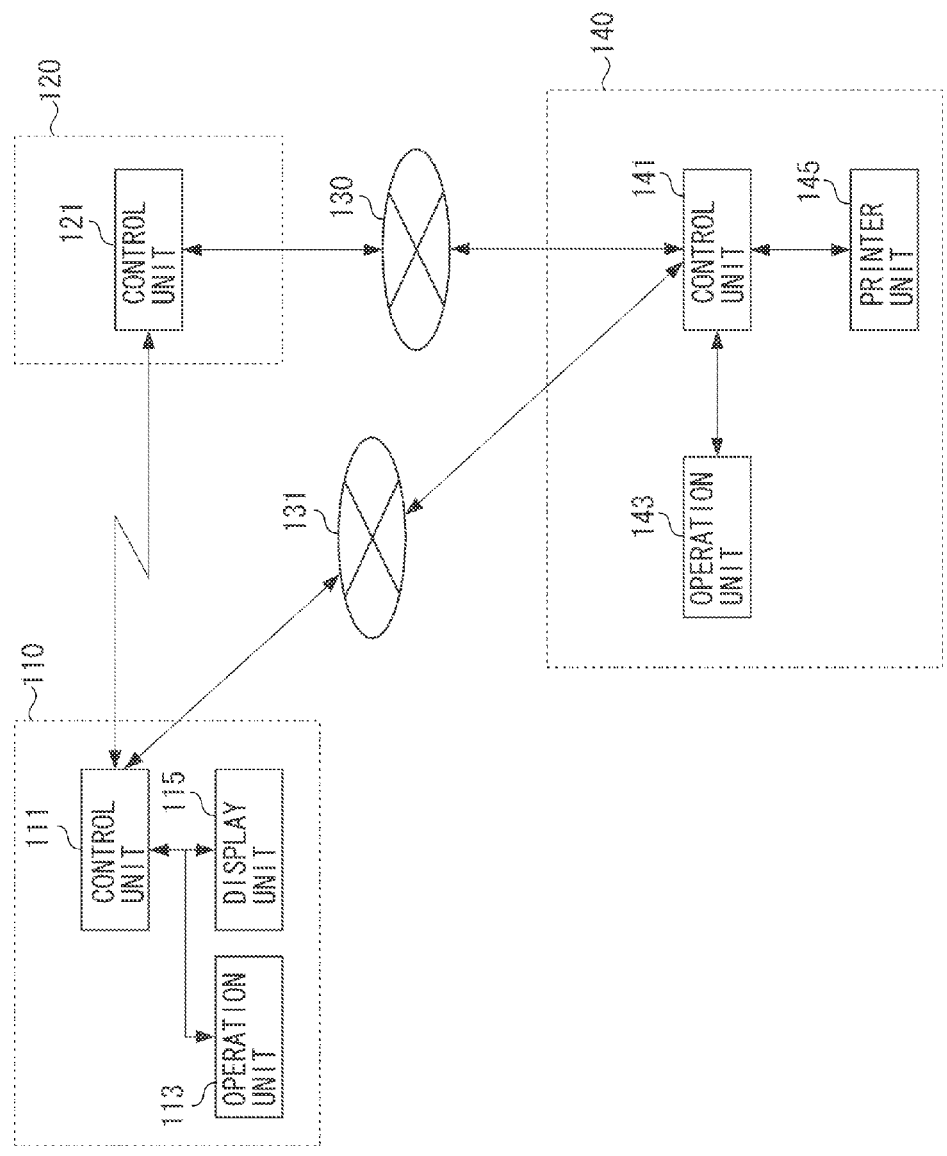
FIG. 1 is a block diagram illustrating an example of a configuration of a printing system according to a first exemplary embodiment.

FIG. 1 is a block diagram illustrating an example of a configuration of a printing system according to a first exemplary embodiment.

In this system, a mobile terminal 110 (hereinafter referred to as mobile) acting as an information processing apparatus communicates with a server 120 acting as an image processing apparatus via electronic mail. The server 120 is connected with a printing device 140 acting as a printing apparatus via a network such as a wide area network (WAN) 130 and communicates therewith. The mobile 110 is connected with a local network 131 to which the printing device 140 belongs and communicates with the printing device 140 using a print service search protocol based on multi-cast or a print control protocol such as Internet Printing Protocol (IPP). Communication between the mobile 110 and the printing device 140 is the one that is performed with the printing device 140 belonging to the same group (the same subnet, for example) in the local network 131 with which the mobile 110 is connected.

In the present exemplary embodiment, the mobile 110 may directly communicates with the printing device 140 or may communicate therewith via one or more servers of a terminal base station of the mobile 110. The server 120 may be connected with the printing device 140 via a local area network (LAN), for example, instead of the WAN 130.

The mobile 110 includes a control unit 111 for entirely controlling the operation of the mobile 110, an operation unit 113 acting as a user interface (I/F), a display unit 115 for displaying an operation result by the operation unit 113 and a screen for using an electronic-mail transmission and reception function in the mobile 110, and a storage unit (not illustrated) for storing various types of data.

The control unit 111 includes a central processing unit (CPU), a read-only memory (ROM), and a random access memory (RAM), which are not illustrated, in the mobile 110. The processes executed by the control unit 111 are realized by the CPU reading programs stored in the ROM and a storage unit (not illustrated) onto the RAM and executing the programs.

The storage unit (not illustrated) in the mobile 110 includes a flash memory, for example, and stores programs for the control unit 111 executing each process regarding the mobile 110 in each flow chart described below, for example.

The operation unit 113 includes a keyboard, a button, and a touch panel, for example. The display unit 115 is a liquid crystal display, for example. The control unit 111 connects with the operation unit 113 and the display unit 115 to control the operation of the operation unit 113 and the display unit 115, respectively.

The control unit 111 controls the execution of the electronic-mail transmission and reception function which is one of functions of the mobile 110. When transmitting electronic mail, the control unit 111 can transmit the electronic data stored in the storage unit (not illustrated) in the mobile 110 by attaching the electronic data to the electronic mail in accordance with input performed by a user via the operation unit 113. The electronic data in the present exemplary embodiment is also referred to as an image. When receiving electronic mail, the control unit 111 controls the display unit 115 to display thereon the contents of the electronic mail received from the server 120.

The server 120 includes a control unit 121 for entirely controlling the operation of the server 120 and a storage unit (not illustrated) for storing various types of data.

The control unit 121 includes a CPU, a ROM, and a RAM, which are not illustrated, in the server 120. The processes executed by the control unit 121 are realized by the CPU reading programs stored in the ROM and the storage unit (not illustrated) in the server 120 onto the RAM and executing the programs. The control unit 121 generates electronic-mail attribute information corresponding to the printing device 140 described below and transmits the information to the printing device 140.

The storage unit (not illustrated) in the server 120 includes a hard disk drive, for example, and stores programs for the control unit 121 executing each process regarding the server 120 in each flow chart described below, for example. The storage unit in the server 120 stores a program for performing image processing on the received electronic data. Further, the storage unit in the server 120 stores and manages the electronic-mail attribute information generated by the control unit 121.

The control unit 121 is connected with the printing device 140 via the WAN 130 to transmit and receive electronic data.

The control unit 121 controls the transmission and reception of the electronic mail with the mobile 110. The control unit 121 executes the transmission and reception of the electronic mail between the server 120 and the printing device 140. Further, the control unit 121 executes the program for image processing to perform image processing on the electronic data received from the mobile 110. In the present exemplary embodiment, the electronic data (print data, for example) that is received from the mobile 110, subjected to the image processing by the control unit 121, and stored in the storage unit (not illustrated) in the server 120 are also referred to as an image transmitted by the mobile 110.

The printing device 140 includes a control unit 141 for entirely controlling the operation of the printing device 140, an operation unit 143 acting as a user interface (UI), a printer unit 145 of an image output device, and a storage unit (not illustrated) for storing various types of data.

The control unit 141 includes a CPU, a ROM, and a RAM, which are not illustrated, in the printing device 140. The processes executed by the control unit 141 are realized by the CPU reading programs stored in the ROM and the storage unit (not illustrated) in the printing device 140 onto the RAM and executing the programs.

The storage unit (not illustrated) in the printing device 140 includes a hard disk drive, for example, and stores programs for the control unit 141 executing each process regarding the printing device 140 in each flow chart described below, for example.

The control unit 141 connects with the operation unit 143 and the printer unit 145 to control the operation of the operation unit 143 and the printer unit 145, respectively. The printing device 140 is connected with the server 120 or the like via the WAN 130. The control unit 141 executes the input and output of electronic data such as print data and device information of the printing device 140 with the server 120. The control unit 141 performs color conversion, a filtering process, resolution conversion, or the like on the output image data to be output to the printer unit 145.

Figure 2:
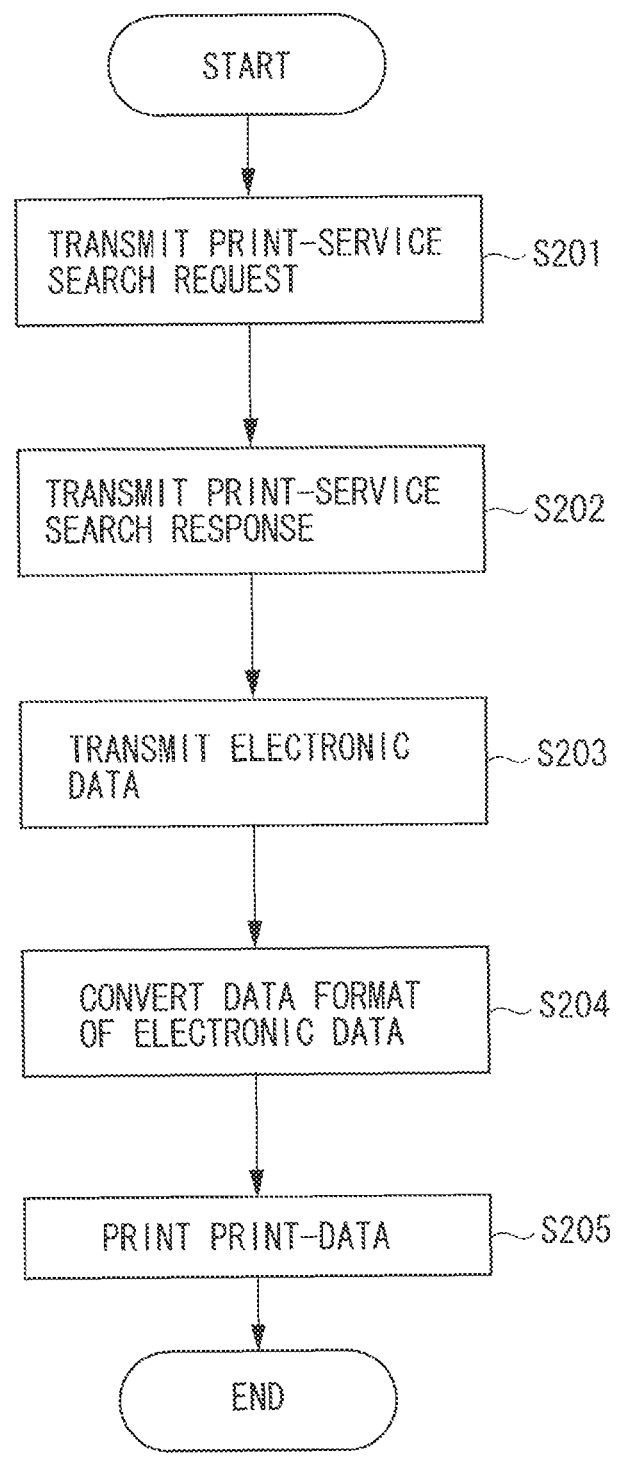
FIG. 2 is a flow chart illustrating a process in the printing system according to the first exemplary embodiment.

FIG. 2 is a flow chart illustrating a process in the printing system according to the present exemplary embodiment. The flow chart in FIG. 2 illustrates a series of processes in which a user issues a selection instruction of electronic data to be printed, which is stored in the storage unit (not illustrated) in the mobile 110, and the electronic data to which the selection instruction is issued is printed by the printing device 140.

Figure 3:
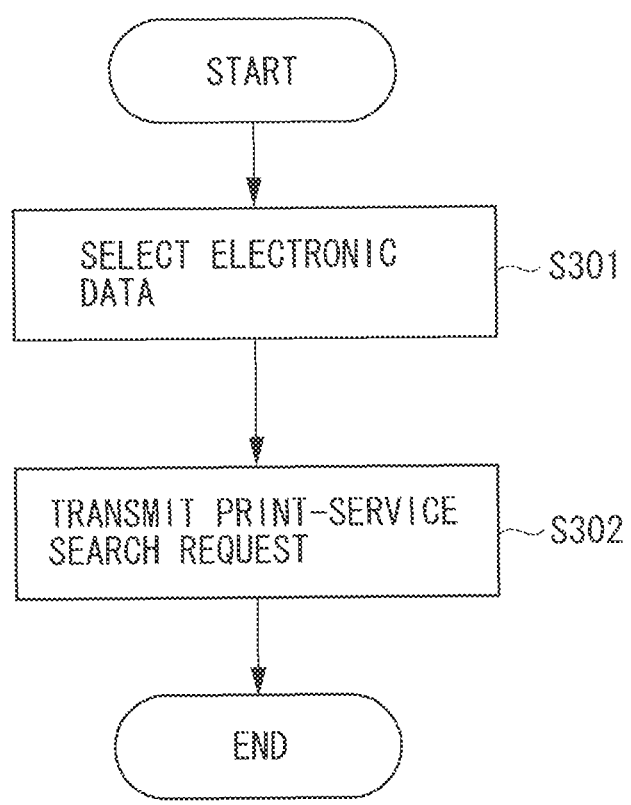
FIG. 3 is a flow chart illustrating a transmission process for a print-service search request of a mobile terminal in the printing system according to the first exemplary embodiment.

In step S201, a process flow illustrated in FIG. 3 is executed.

Figure 5:
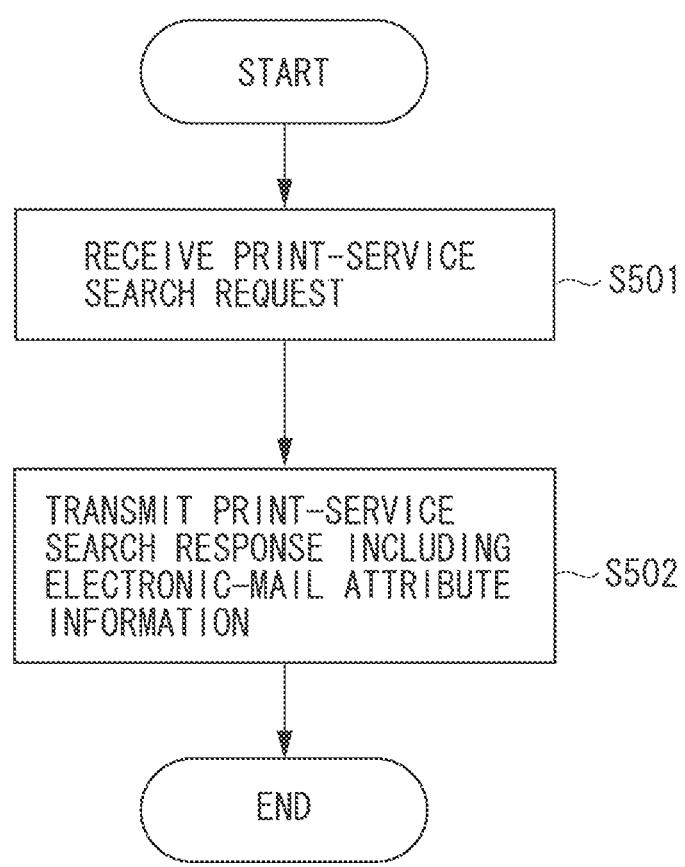
FIG. 5 is a flow chart illustrating a transmission process for a print-service search response of a printing device in the printing system according to the first exemplary embodiment.

In step S202, a process flow illustrated in FIG. 5 is executed.

Figure 6:
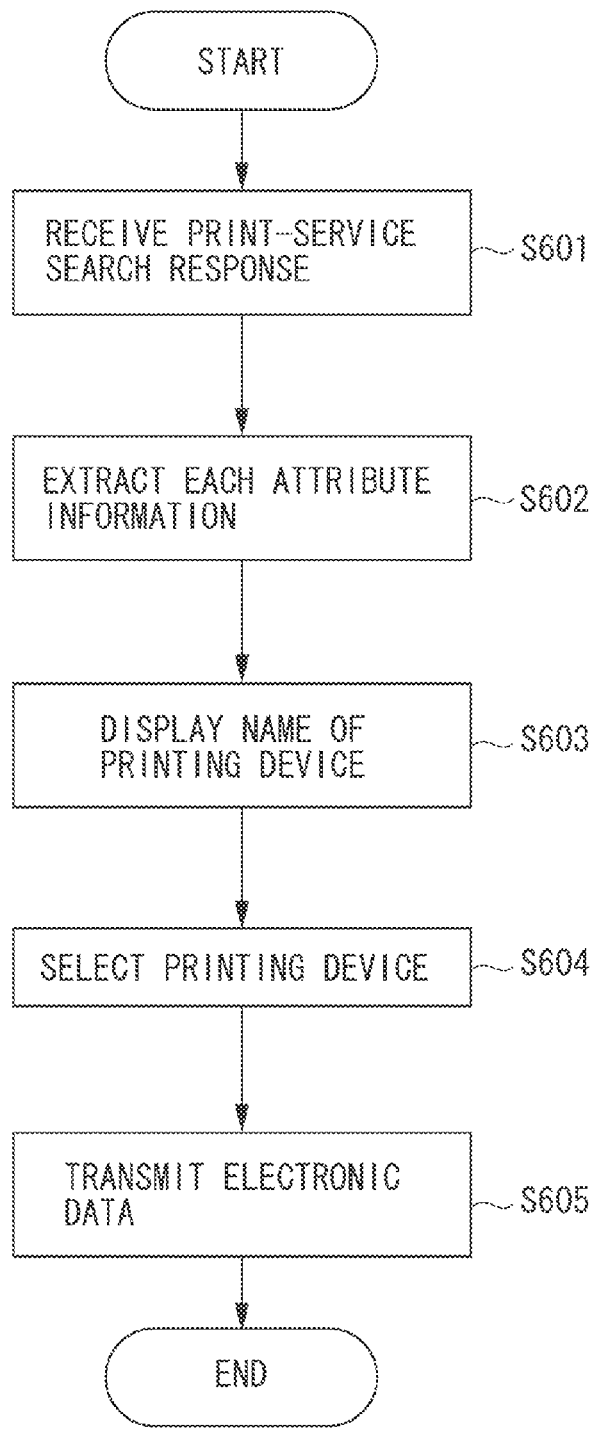
FIG. 6 is a flow chart illustrating a transmission process of electronic data of the mobile terminal in the printing system according to the first exemplary embodiment.

In step S203, a process flow illustrated in FIG. 6 is executed.

Figure 7:
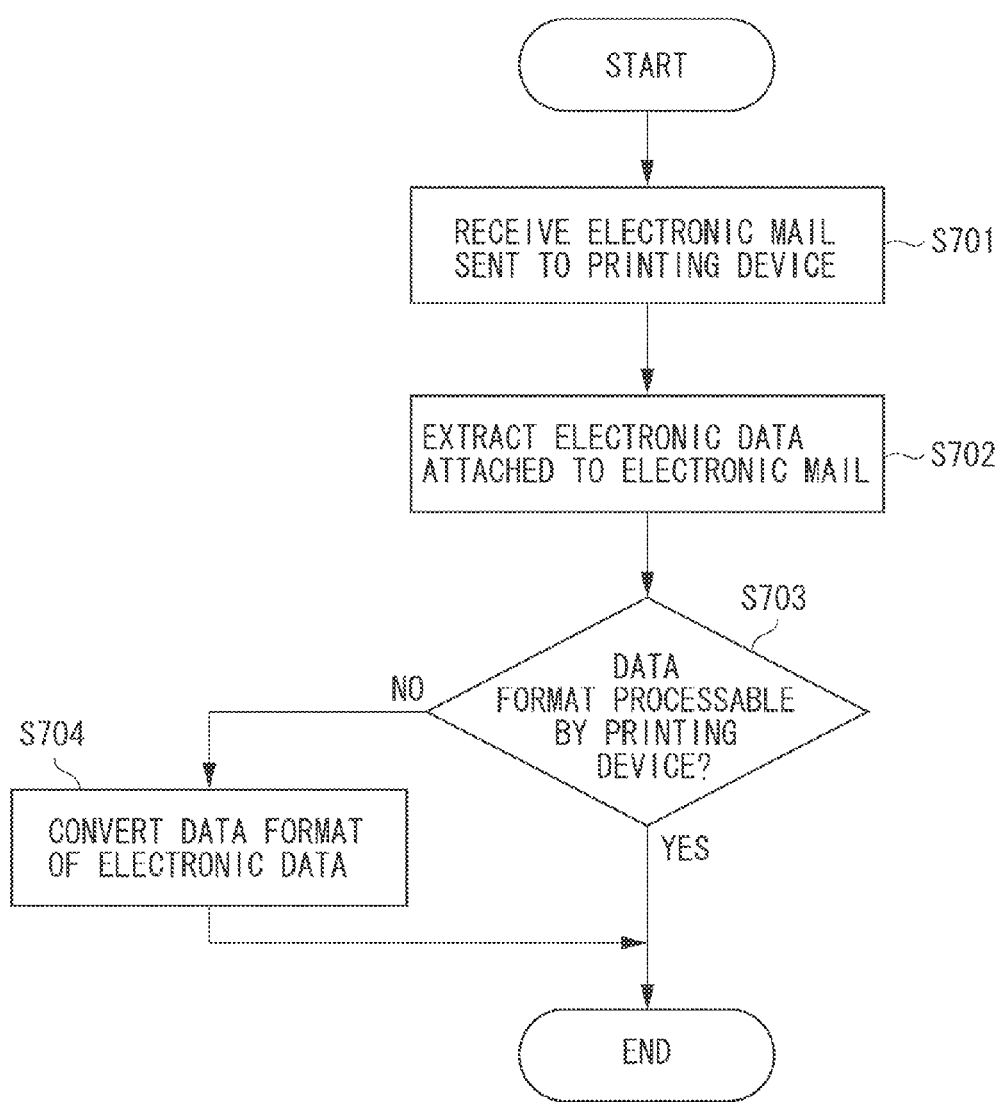
FIG. 7 is a flow chart illustrating a conversion process for a data format of electronic data of a server in the printing system according to the first exemplary embodiment.

In step S204, a process flow illustrated in FIG. 7 is executed.

Figure 8:
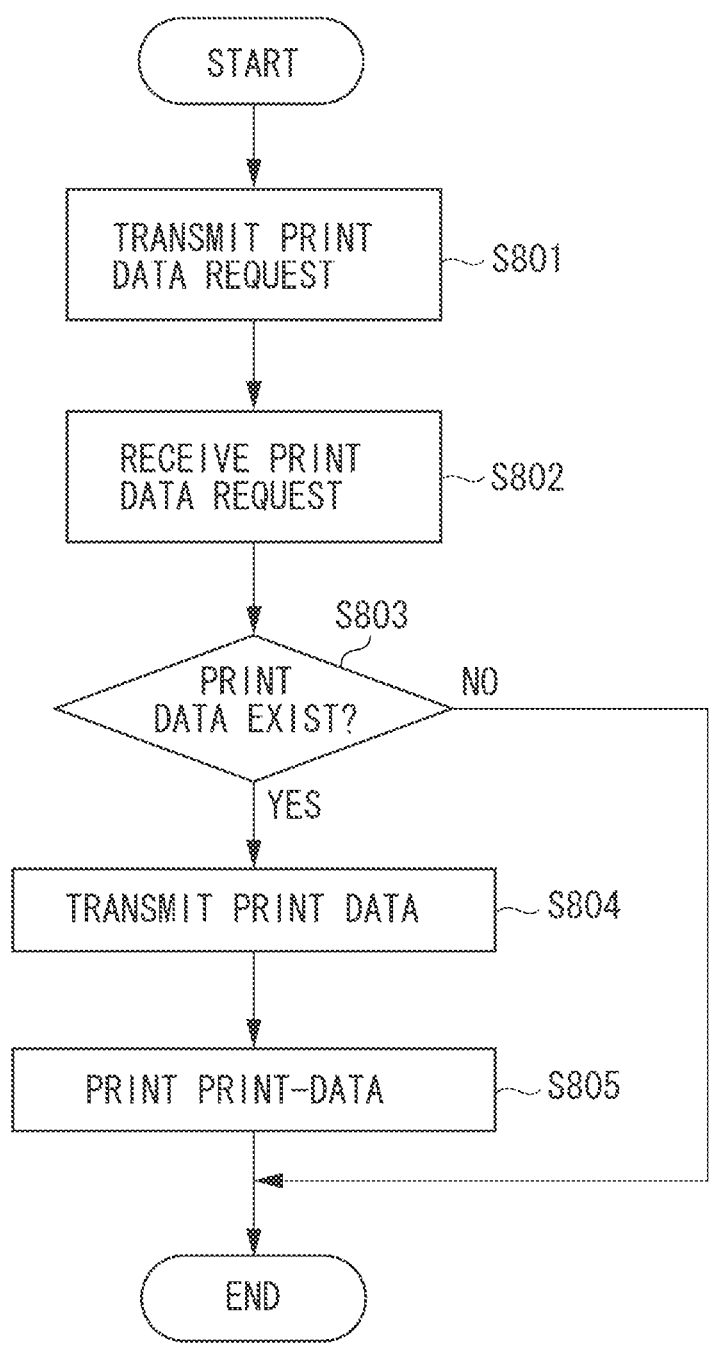
FIG. 8 is a flow chart illustrating a printing process for print data in the printing system according to the first exemplary embodiment.

In step S205, a process flow illustrated in FIG. 8 is executed.

The process performed in step S201 in FIG. 2 is described below with reference to FIG. 3. FIG. 3 is a flow chart illustrating the process performed by the mobile 110 according to the present exemplary embodiment which is executed by the control unit 111. The flow chart in FIG. 3 illustrates a series of processes in which the mobile 110 having the electronic data to be printed transmits a print-service search request to the network of the group to which the printing device 140 belongs.

Figure 4A:
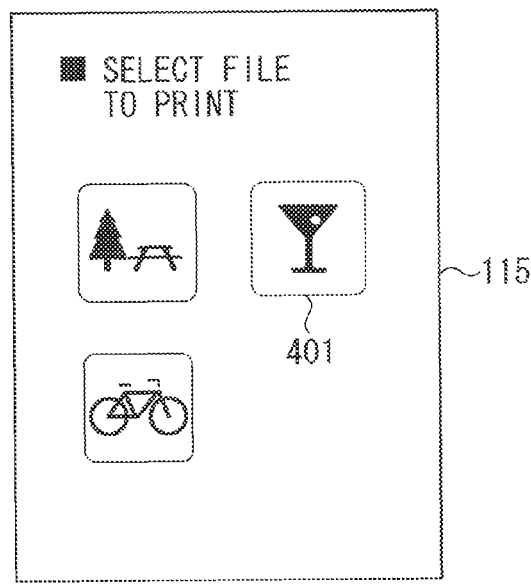
FIGS. 4A and 4B illustrate examples of an electronic data selection screen and a print device selection screen of the mobile terminal in the printing system according to the first exemplary embodiment respectively.

In step S301, the control unit 111 of the mobile 110 selects electronic data based on a user's selection instruction on a selection screen exemplified in FIG. 4A. The selection of electronic data to be printed is described below with reference to FIG. 4A.

The control unit 111 of the mobile 110 displays a list of icons corresponding to the electronic data stored in the storage unit (not illustrated) of the mobile 110 on the display unit 115 of the mobile 110. The user selects the icon corresponding to the electronic data displayed on the display unit 115 via the operation unit 113 of the mobile 110 to issue a selection instruction of the electronic data to be printed. An icon 401 corresponds to the electronic data displayed in the list.

If the operation unit 113 is a touch panel UI in which the operation unit 113 is integrated with the display unit 115, the user presses the icon in the list displayed on the display unit 115 to issue the selection instruction of the electronic data. If the operation unit 113 is a keyboard UI for operating a cursor displayed on the display unit 115, the cursor is moved onto the icon and an appropriate operation is performed via the operation unit 113, accordingly the selection instruction of the electronic data is issued. The control unit 111 of the mobile 110 selects the electronic data to be printed based on such a user's selection instruction. The present invention is not limited to a method for issuing a selection instruction of electronic data.

Description returns to the flow chart in FIG. 3. In step S302, the control unit 111 of the mobile 110 transmits the print-service search request to the group to which the printing device 140 belongs in the local network 131 connected with the printing device 140.

The print-service search request is a request for searching the network for the printing device 140 providing the print service. The printing device 140 providing the print service responds to the print-service search request and returns information about each attribute including the electronic-mail attribute information (see FIG. 10) of the printing device 140 to the mobile 110.

The electronic-mail attribute information is information notified from the server 120 as a response to a request that the printing device 140 makes to the server 120 to issue the electronic-mail attribute information to be allocated to the printing device 140 itself. More specifically, the electronic-mail attribute information is stored in the storage unit (not illustrated) in the server 120 and managed as information for the server 120 uniquely identifying the printing device 140 as describe above.

A service search protocol is used for transmitting the print-service search request. For example, if a multicast domain name system (DNS) (hereinafter referred to as mDNS) is used, the print-service search request can be realized by taking a service type searched by the multicast DNS as "_printer," "_pdl-datastream," and "_ipp." The print-service search request can also be realized using a Service Location Protocol (hereinafter referred to as SLP).

In other words, according to the present exemplary embodiment, the print-service search request is a request for transmitting the electric-mail attribute information transmitted by the mobile 110 using the service search protocol.

The mobile 110 according to the present exemplary embodiment is the one that has authority to access a network via an access point of the network. If access control using a password or the like is imposed to the network, the mobile 110 cannot transmit the print-service search request to the network unless the mobile 110 has the authority to access the network.

The process performed in step S202 in FIG. 2 is described in detail below with reference to FIG. 5. FIG. 5 is a flow chart illustrating the process performed by the printing device 140 according to the present exemplary embodiment and executed by the control unit 141. The flow chart in FIG. 5 illustrates a series of processes in which the printing device 140 transmits a print-service search response including information such as the electronic-mail attribute information to the mobile 110 if the printing device 140 receives a print-service search request from the mobile 110 including the electronic data to be printed.

The printing device 140 according to the present exemplary embodiment is connected to the local network with which the mobile 110 connects when transmitting the print-service search request. When the printing device 140 receives the print-service search request from the mobile 110, the printing device 140 transmits the print-service search response including the electronic-mail attribute information as a response to the mobile 110.

In step S501, the control unit 141 of the printing device 140 receives the print-service search request from the mobile 110 including the electronic data to be printed. The control unit 141 corresponds to a reception unit. The print-service search request is transmitted using the above-described service search protocol to the group to which the printing device 140 belongs in the local network connected with the mobile 110.

In step S502, if the control unit 141 of the printing device 140 receives the print-service search request, the control unit 141 transmits the print-service search response including the electronic mail attribute information (an electronic mail address, for example) of the printing device 140 and name attribute information (a name of the printing device, for example) of the printing device 140 to the mobile 110. The control unit 141 corresponds to a transmission unit. Each of the attribute information set to the print-service search response is stored in the storage unit (not illustrated) in the printing device 140. The print-service search response is described below with reference to FIG. 10. In the present exemplary embodiment, the electronic-mail attribute information is described as an electronic-mail address.

The print-service search response transmitted by the printing device 140 according to the present exemplary embodiment is described below with reference to FIG. 10.

FIG. 10 illustrates an example of the attribute information included in the print-service search response transmitted by the control unit 141 of the printing device 140 in step S502.

In FIG. 10, name attribute information 1000 of the printing device 140, namely a name 1000 of the printing device 140 can be arbitrary set by a manager of the printing device 140.

Page description language (PDL) attribute information 1001 of the printing device 140 in FIG. 10 indicates data format by which the printing device 140 can perform printing. More specifically, the PDL attribute information corresponds to information indicating an image format that can be processed by the printing device 140. In the present exemplary embodiment, the information 1001 indicates that the printing device 140 can print the Joint Photographic Experts Group (JPEG) and tagged image file format (TIFF) data formats.

Color attribute information 1002 of the printing device 140 in FIG. 10 indicates whether the printing device 140 can perform color printing. In the present exemplary embodiment, because "True" is set, the information 1002 indicates that the printing device 140 can perform color printing. If "False" is set, the printing device 140 can perform only monochrome printing.

Duplex printing attribute information 1003 in FIG. 10 indicates whether the printing device 140 can perform duplex printing. In the present exemplary embodiment, because "False" is set, the information 1003 indicates that the printing device 140 cannot perform duplex printing. If "True" is set, the printing device 140 can perform duplex printing.

Electronic-mail attribute information 1004 in FIG. 10 indicates an electronic-mail address allocated to the printing device 140. In FIG. 10, the information 1004 indicates that "printer_kaihatsu1@xxx.canon.jp" is allocated to the printing device 140 as the electronic-mail attribute information. As becomes clear below, the electronic-mail attribute information (an electronic-mail address, for example) is information to be used by the mobile 110 to transmit an image to the printing device 140 via the server 120. The image transmitted to the printing device 140 indicates an image to be printed, which is included in the mobile 110. In the following description, the term electronic-mail address refers to the electronic-mail attribute information.

The process performed in step S203 in FIG. 2 is described in detail below with reference to FIG. 6. FIG. 6 is a flow chart illustrating the process performed by the mobile 110 according to the present exemplary embodiment and executed by the control unit 111. The flow chart in FIG. 6 illustrates a series of processes in which the mobile 110 receives the print-service search response including the electronic-mail attribute information from the printing device 140 providing the print service and transmits the electronic data included in the mobile 110 using the electronic-mail attribute information.

In step S601, the control unit 111 of the mobile 110 receives the print-service search response from the printing device 140.

In step S602, the control unit 111 of the mobile 110 extracts each attribute information such as the electronic-mail attribute information, the name attribute information, and the like from the print-service search response. The control unit 111 associates the extracted attribute information with the name attribute information of the printing device 140, and stores and manages the attribute information in the storage unit (not illustrated) of the mobile 110. As a management method of the electronic-mail attribute information, an address book function provided on the mobile 110 can be utilized. For example, if each attribute information is managed using the address book function in the mobile 110, each attribute information can be managed so that the electronic-mail address corresponding to the printing device 140 is displayed by searching the name of the printing device 140.

In step S603, the control unit 111 of the mobile 110 displays, on the display unit 115 of the mobile 110, the list (FIG. 4B) of the names of the printing devices 140 including the electronic-mail attribute information in the print-service search response received in step S601. The name of the printing device 140 displayed on the list is based on the name attribute information extracted in step S602. If the print-service search response is received from a plurality of the printing devices 140, the names of the plurality of the printing devices 140 can be displayed. The user can select a desired printing device 140 from among the names of the printing devices 140 displayed on the list.

In step S604, the control unit 111 of the mobile 110 selects the printing device 140 based on a user's selection instruction. The selection of the printing device 140 is described below with reference to FIG. 4B.

Figure 4B:
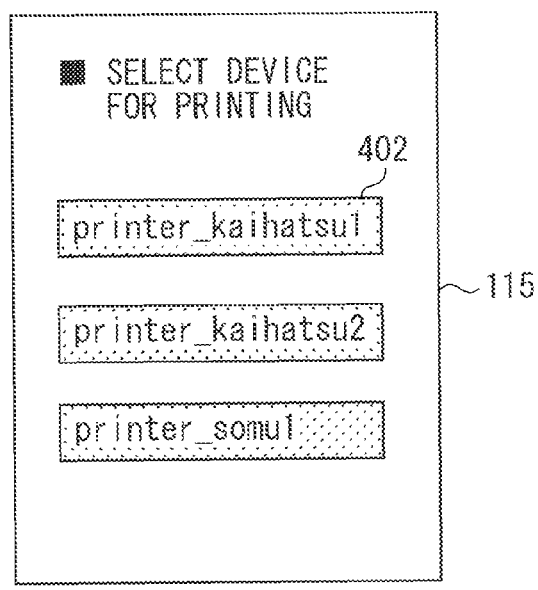

A screen illustrated in FIG. 4B is displayed on the display unit 115 of the mobile 110 and used for selection instruction of the printing device 140 (a print device selection screen). After the user selects the electronic data to be printed on the electronic data selection screen in FIG. 4A, the screen on the display unit 115 is shifted to display the screen in FIG. 4B.

Before the screen in FIG. 4B is displayed, the control unit 111 of the mobile 110 performs a print-service search process described in FIG. 3.

The display unit 115 of the mobile 110 displays a name list 402 of the printing devices searched in the process in step S603. The user can issue a selection instruction of the printing device displayed on the name list 402 of the printing devices via the operation unit 113. The method for issuing a selection instruction is similar to that for issuing the selection instruction of the electronic data in step S301.

Description returns to the flow chart in FIG. 6. In step S605, the control unit 111 of the mobile 110 reads the electronic-mail attribute information (the electronic mail address, for example) corresponding to the selected printing device 140 from each attribute information extracted in step S602. The control unit 111 of the mobile 110 transmits the electronic mail to which the electronic data (a portable document format (PDF) data, for example) selected in step S301 are attached to the electronic-mail address which is the read electronic-mail attribute information. In other words, the mobile 110 transmits the electronic data included in the mobile 110 using the electronic-mail attribute information. The electronic data used here is also referred to as an image transmitted by the mobile 110 using the electronic-mail attribute information. In the present exemplary embodiment, a portion of domain of the electronic-mail address ("xxx.canon.jp", for example) corresponding to the printing device 140 is common and the electronic mail with the domain as an address is delivered to the server 120.

The process performed in step S204 in FIG. 2 is described in detail below with reference to FIG. 7. FIG. 7 is a flow chart illustrating the process performed by the server 120 according to the present exemplary embodiment and executed by the control unit 121. The flow chart in FIG. 7 illustrates a series of processes in which the server 120 receives the electronic data transmitted in step S203 and, if required, converts the received electronic data into data with the data format which the printing device 140 can subject to printing process. The server 120 described below functions as a mail server for receiving the electronic mail sent to the domain of the electronic-mail address corresponding to the printing device 140.

In step S701, the control unit 121 of the server 120 receives the electronic mail sent to the electronic-mail address (to the printing device) corresponding to the printing device 140. Although not illustrated in FIG. 7, the control unit 121 can determine whether the received electronic mail is sent to the electronic-mail address corresponding to the printing device 140 and determine whether the processes in the subsequent steps S702 to S704 are executed.

More specifically, the control unit 121 determines whether the information indicating the destination of the received electronic mail (the electronic-mail address in a To field, for example) exists in one or more pieces of the electronic-mail attribute information managed in the storage unit of the server 120. If the information exists therein, the control unit 121 may execute the processes in the subsequent steps S702 to S704, whereas if not, the control unit 121 may not execute the processes in the subsequent steps S702 to S704. Accordingly, the printing by the printing device 140 via the server 120 can be managed.

In step S702, the control unit 121 of the server 120 extracts the electronic data attached to the received electronic mail and stores the electronic data in the storage unit (not illustrated) in the server 120.

In step S703, the control unit 121 of the server 120 analyses the electronic data received in step S702 to determine whether the data format of the electronic data needs to be converted.

More specifically, the control unit 121 determines whether the printing device 140 can print the electronic data without converting the data format of the electronic data received by the control unit 121. The server 120 previously stores a table in which the data format that the printing device 140 can process is recorded. The table is created such that, for example, the printing device 140 notifies the server 120 of the data format that the printing device 140 can process, and the server 120 registers the data format in the table.

If the data format of the electronic data is not the one that can be printed by the printing device 140 (in other words, not the electronic data of the data format that can be processed by the printing device 140) (NO in step S703), in step S704, the control unit 121 of the server 120 converts the data format of the electronic data into the data format that can be processed by the printing device 140. Then, the control unit 121 stores the converted data as print data in the storage unit (not illustrated) of the server 120.

If the data format of the electronic data is the one that can be processed by the printing device 140 (in other words, the electronic data of the data format that can be processed by the printing device 140) (YES in step S703), the control unit 121 stores the received electronic data as it is in the storage unit of the server 120 as print data and ends the process. In the present exemplary embodiment, the data of the data format that can be processed by the printing device 140 is JPEG data, for example.

When the print data is stored in the storage unit (not illustrated) in the server 120, the control unit 121 of the server 120 associates the print data with the electronic-mail address which is the address of the electronic mail received in step S701 and stores the print data. Since the electronic-mail address corresponds to the printing device 140, the electronic-mail address functions as information used for associating the print data with the printing device 140 that receives the print data. A correspondence relationship between the print data and the printing device 140 is stored by the control unit 121 in the storage unit of the server 120 as data-to-device correspondence information which indicates the correspondence relationship.

The process performed in step S205 in FIG. 2 is described in detail below with reference to FIG. 8. FIG. 8 is a flow chart illustrating the process performed by the server 120 and the printing device 140 according to the present exemplary embodiment and executed by the control unit 121 of the server 120 and the control unit 141 of the printing device 140. The flow chart in FIG. 8 illustrates a series of processes in which the printing device 140 receives the print data stored in the storage unit of the server 120 from the server 120 to print the received data, as a result of performing a series of processes in FIG. 7.

In step S801, the control unit 141 of the printing device 140 transmits a print data request to the server 120. The control unit 141 functions also as an acquisition unit. The term print data request refers to a request for transmitting the print data of the server 120 which are transmitted from the printing device 140 to the server 120. The print data used here is also referred to as an image transmitted by the mobile 110 using the electronic-mail attribute information.

Figure 9:
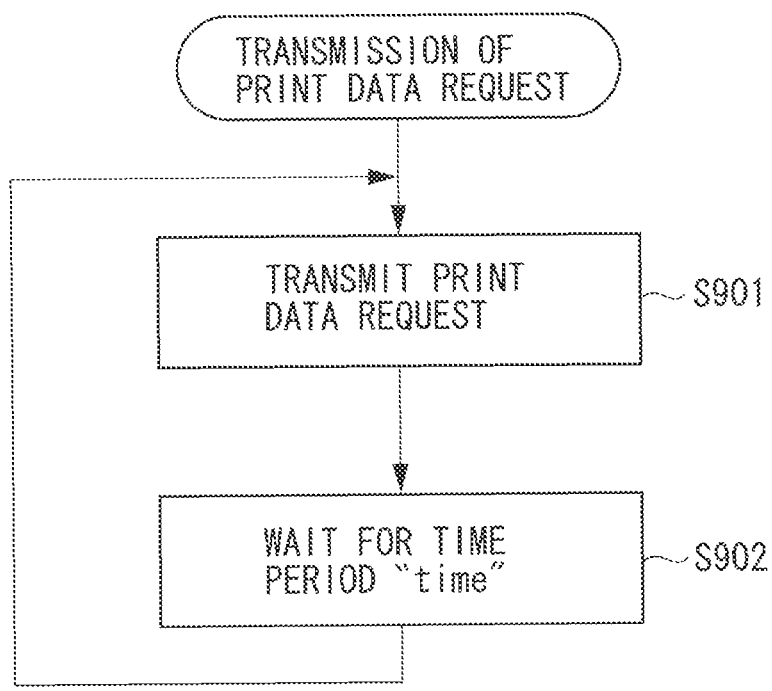
FIG. 9 is a flow chart illustrating a transmission process for print data request of the printing device in the printing system according to the first exemplary embodiment.

The transmission of the print data request is realized by a periodic polling, for example (refer to FIG. 9). In step S901, the control unit 141 of the printing device 140 transmits the print data request. In step S902, the control unit 141 waits for the process during a predetermined time interval "time" and repeats the process again from step S901. In the present exemplary embodiment, the time interval "time" for polling is assumed to be set to one minute, for example. Herein, the control unit 141 corresponds to the acquisition unit.

In step S802, the control unit 121 of the server 120 receives the print data request from the printing device 140.

In step S803, the control unit 121 of the server 120 checks whether the print data sent to the printing device 140 which transmits the print data request is stored in the storage unit (not illustrated) of the server 120. In this check, the control unit 121 of the server 120 confirms whether the print data exist therein with reference to the data-to-device correspondence information stored in the storage unit of the server 120.

If the print data sent to the printing device 140 exist (YES in step S803), in step S804, the control unit 121 of the server 120 transmits the print data to the printing device 140. If the print data sent to the printing device 140 does not exist (NO in step S803), the process is ended.

If the printing device 140 receives the print data from the server 120, in step S805, the control unit 141 of the printing device 140 prints the received print data. The printing is performed such that the control unit 141 renders the received print data and transmits the rendered data as intermediate data (DisplayList data or download (DL) data, for example) to the printer unit 145. The printing device 140 receiving the print data is also represented as the printing device 140 acquiring the image. The image is the one that the mobile 110 transmits using the electronic-mail attribute information (the electronic mail address, for example).

The process for the printing device 140 receiving and printing the print data is described above using the flow chart.

According to the present exemplary embodiment, as described above, the mobile 110 directly inquires of the printing device 140 the electronic-mail address corresponding to the printing device 140 for printing the electronic data, and receives the electronic-mail address. Thus, the user operating the mobile 110 can easily acquire the electronic-mail address. The present exemplary embodiment allows the user to transmit the electronic data without troublesome operations by automatically searching for the printing device 140 and receiving the electronic-mail address corresponding to the printing device 140 in conjunction with selection of the electronic data by the user.

According to the present exemplary embodiment, the electronic data is selected and then the print-service search request is transmitted to receive the electronic-mail address to print the electric data. The present invention, however, is not limited this configuration. For example, the electronic-mail address corresponding to the printing device is once received in step S202 and stored in the address book of the mobile 110 or the like. Thus, if the electronic data is printed by the printing device next time, the electronic data can be directly transmitted from the electronic mail address stored in the address book using an electronic-mail transmission application in the mobile 110.

According to the first exemplary embodiment, the mobile 110 attaches electronic data to electronic mail and transmits the electronic data to the server 120 irrespective of a data format of the electronic data (in step S605 in FIG. 6). In a second exemplary embodiment, a configuration is described below which determines whether a mobile 110 transmits to a server 120 electronic mail with electronic data to be printed attached or directly transmits the electronic data to be printed to a printing device 140 via a network to which the printing device 140 belongs according to a data format of the electronic data.

According to the present embodiment, a printing process is performed at a high speed by determining a method for transmitting electronic data according to a data format of the electronic data. Unless otherwise specified, the configuration of the present exemplary embodiment is similar to that of the first exemplary embodiment. In the following description, a data format of electronic data also means an image format of an image. A data format processable by the printing device also means an image format processable by the printing device.

Figure 11:
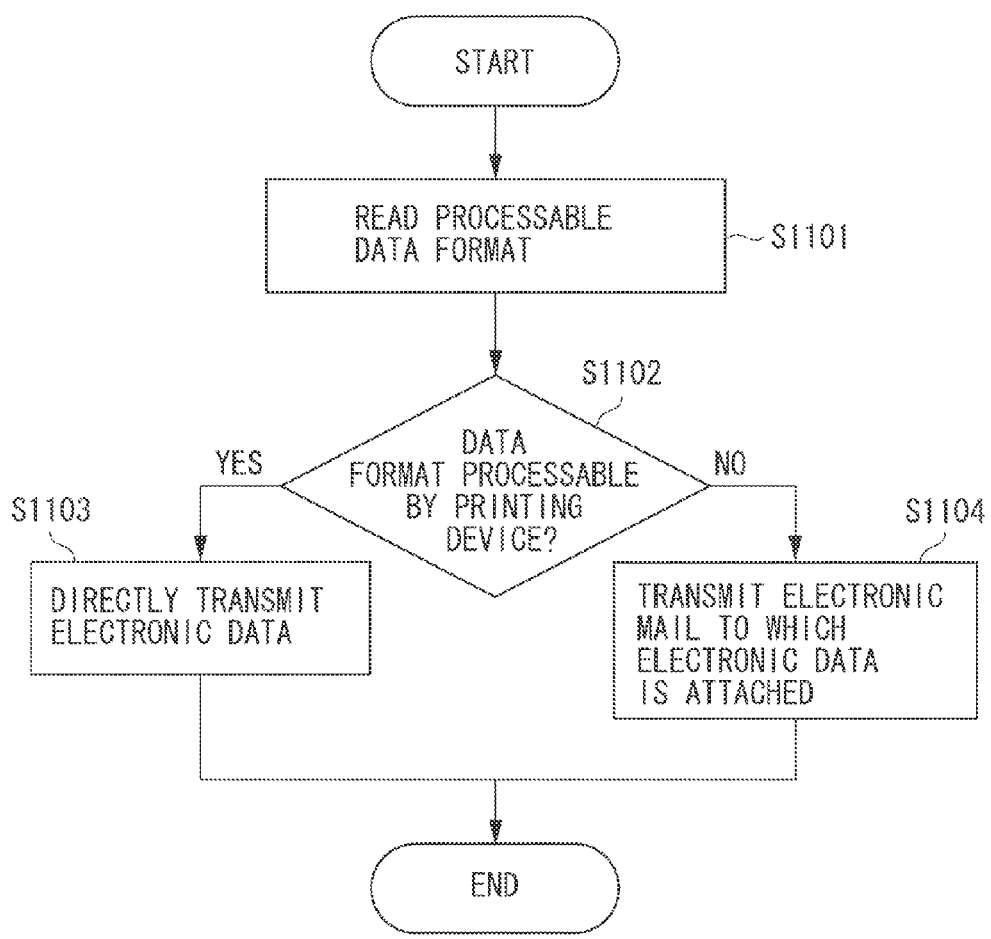
FIG. 11 is a flow chart illustrating a transmission process for print data of a mobile terminal in a printing system according to a second exemplary embodiment.

The process for transmitting print data in the mobile 110 according to the present exemplary embodiment is described in detail below with reference to FIG. 11. FIG. 11 is a flow chart illustrating the process performed in the mobile 110 according to the present exemplary embodiment and executed by the control unit 111. A series of processes in the flow chart in FIG. 11 corresponds to the process in step S605 in FIG. 6 which is described in the first exemplary embodiment.

In step S1101, the control unit 111 of the mobile 110 reads the data format which can be processed by the printing device 140 selected in step S604 in FIG. 6 from the PDL attribute information included in the print-service search response. For example, the data format (JPEG or TIFF) illustrated in the PDL attribute information 1001 in FIG. 10 is read.

In step S1102, the control unit 111 of the mobile 110 determines whether the data format of the electronic data selected in step S301 in FIG. 3 is included in the data format read in step S1101. More specifically, the control unit 111 of the mobile 110 determines whether the electronic data to be printed, which is included in the mobile 110, is the ones of the data format which can be processed by the printing device 140.

If it is determined that the data format of the electronic data can be processed by the printing device 140 (YES in step S1102), in step S1103, the control unit 111 of the mobile 110 directly transmits the selected electronic data to the selected printing device 140 without using the electronic-mail address and ends the process. Thus, the printing device 140 receives the electronic data transmitted by the mobile 110 without using the electronic-mail address without passing through the server 120 according to such a series of the processes. As a method for directly transmitting the electronic data, the control unit 111 can use printing protocols such as a line printer daemon protocol (LPR) and Internet Printing Protocol (IPP). In this case, the printing device 140 receives the electronic data as the processable print data and prints the received data.

If it is determined that the data format of the electronic data cannot be processed by the printing device 140 (NO in step S1102), in step S1104, as is the case of the process in step S605 in FIG. 6 described in the first exemplary embodiment, the control unit 111 of the mobile 110 transmits the electronic mail to which the electronic data is attached to the electronic-mail address corresponding to the selected printing device 140 and ends the process. As described in the first exemplary embodiment, then the processes in steps S204 and S205 are executed. According to such a series of processes, the electronic data transmitted by the mobile 110 using the electronic-mail address in step S1104 passes through the server 120 to be subjected to the process in step S704 in FIG. 7 and is converted to the data of a processable data format by the printing device 140. Then, the printing device 140 receives the converted data as print data and prints the received data.

In the present exemplary embodiment described above, if the data format of the electronic data to be printed can be processed by the printing device 140, the electronic data are directly transmitted to the printing device 140 via the network to which the printing device 140 belongs without passing through the server 120. Generally, a communication band of a network such as a LAN is broader than a communication band used for transmitting electronic mail and the communication performance of the network is high, so that the electronic data whose data format does not need to be converted is directly transmitted to the printing device 140, and a higher speed printing process can be realized. In addition, a process waiting-time for which the printing device 140 transmits a print-data request and waits until receiving the print data can be decreased, and a higher speed printing process can be realized.

According to the first exemplary embodiment, the printing device 140 always transmits print data request to the server 120 at a constant interval irrespective of whether the print-service search request is received or not. The print-service search request can be considered as information for notifying the printing device 140 that the electronic data to be printed (the electronic data) is transmitted by a user.

In a third exemplary embodiment, a configuration is described below which can realize a high speed printing by shortening a time interval that the printing device 140 transmits a print data request in conjunction with reception of a print-service search request to quickly receive print data sent to a printing device 140. Unless otherwise specified, the configuration of the present exemplary embodiment is similar to that of the first exemplary embodiment.

Figure 12:
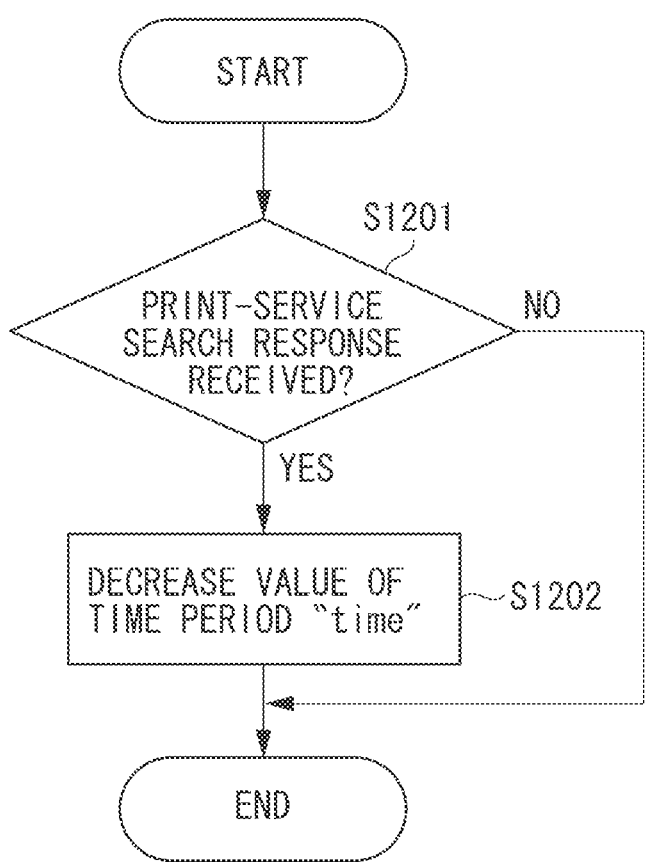
FIG. 12 is a flow chart illustrating a process for reducing a time interval that a printing device transmits a print data request in a printing system according to a third exemplary embodiment.

With reference to FIG. 12, a process is described in which a time interval "time" for polling is set to a short time period in a transmission process of a print data request performed by the printing device 140 (see FIG. 9). FIG. 12 is a flow chart illustrating a process performed by the printing device 140 according to the present exemplary embodiment and controlled by the control unit 141.

In step S1201, the control unit 141 of the printing device 140 determines whether to receive the print-service search request in step S501 in FIG. 5 described in the first exemplary embodiment.

If the control unit 141 receives the print-service search request in step S501 (YES in step S1201), in step S1202, the control unit 141 of the printing device 140 sets the value of the "time" to a smaller value for a certain time period than the value set before the control unit 141 receives the print-service search request. More specifically, the control unit 141 of the printing device 140 shorter the time interval of the polling to the server 120 in transmission of the print data request by the printing device 140 (see FIG. 9) for a certain time period than the time interval set before the control unit 141 receives the print-service search request.

In step S1202, the value of the "time" is returned to the original value after the certain time period elapses since the control unit 141 received the print-service search request. More specifically, the control unit 141 of the printing device 140 shortens the time interval for the polling to the server 120 in the transmission of the print data request for the certain time period after the control unit 141 receives the print-service search request. Regarding the change of the value of the "time," for example, the control unit 141 of the printing device 140 sets the value of the "time" to one minute at the normal mode (before the control unit 141 receives the print-service search request) and five seconds for a certain time period after the control unit 141 receives the print-service search request. If the control unit 141 of the printing device 140 does not receive the print-service search request (NO in step S1201), the value of the "time" is not changed.

In the present exemplary embodiment described above, the time interval for polling with respect to the print data request to the server 120 by the printing device 140 is shortened only for a certain time period when the control unit 141 receives the print-service search request. By shortening the polling interval of the print-service search request allows the printing device 140 to quickly receive the print data stored in the server 120 and allows starting printing quickly. Further, according to the present exemplary embodiment, the polling interval is not shortened at all times, but shortened only for a certain time period when the control unit 141 receives the print-service search request, so that the start of printing can be advanced without increasing so much the load of the server 120 receiving the polling.

The present exemplary embodiment may be realized in combination with the second exemplary embodiment.

According to the first exemplary embodiment, when the printing device 140 receives the service search request, the printing device 140 transmits the print-service search response including the electronic-mail attribute information to the mobile 110. If there is a plurality of the printing devices 140 which transmit the electronic-mail attribute information as its response, the plurality of the printing devices 140 is displayed on the display unit 115 of the mobile 110, and the user can select a desired printing device 140 from among the plurality of the printing devices 140.

In a fourth exemplary embodiment, a configuration is described below in which a response switch for electronic-mail attribute information is provided on a printing device 140 to allow a user to select a printing device 140 displayed on a display unit 115 of the printing device 140, so that the user can easily select the desired printing device 140. More specifically, the printing device 140 is provided with the response switch for the electronic-mail attribute information, and the user turns on the response switch to allow the printing device 140 to transmit the electronic-mail attribute information to the mobile 110 for a certain time period as a response of the print-service search request.

According to the present exemplary embodiment, the response switch described below is of a button-shaped graphical user interface (GUI) displayed on an operation display (not illustrated) of the operation unit 143 in the printing device 140, however, the response switch may be a hard switch provided on the printing device 140. Unless otherwise specified, the configuration of the present exemplary embodiment is similar to that of the first exemplary embodiment.

Figure 13:
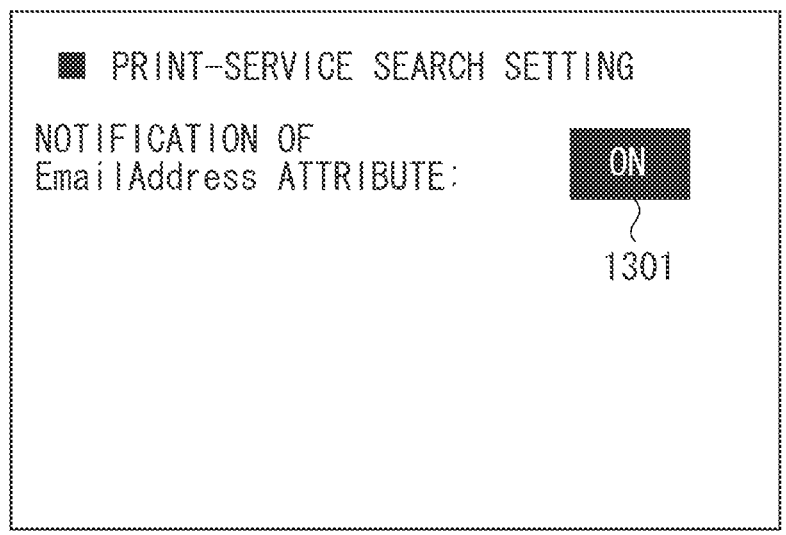
FIG. 13 is an example of an electronic-mail attribute response switching screen of a printing device in a printing system according to a fourth exemplary embodiment.

A screen of the response switch for the electronic-mail attribute information of the printing device 140 according to the present exemplary embodiment is described in detail below with reference to FIG. 13. FIG. 13 is a setting screen used for a print service search and displayed on the operation display of the operation unit 143.

In the present exemplary embodiment, a response switch 1301 is normally set to OFF. If the control unit 141 of the printing device 140 receives the print-service search request from the mobile 110 in step S501 based on the setting of the response switch 1301, the control unit 141 transmits the print-service search response to the mobile 110 without including the electronic mail attribute information in step S502.

The user can set the response switch 1301 of the printing device 140 for printing the electronic data to ON. When the setting of the response switch 1301 is changed to ON, the control unit 141 of the printing device 140 changes the setting such that the electronic-mail attribute information is included in the print-service search response for a certain time period (one minute, for example) after the response switch 1301 is set to ON.

In other words, the response switch 1301 corresponds to a setting unit which sets whether to permit the control unit 141 to transmit the electronic-mail attribute information to the mobile 110. If the response switch 1301 is set to ON, which means that the control unit 141 is permitted to transmit the electronic-mail attribute information to the mobile 110. Thus, when the control unit 141 of the printing device 140 receives the print-service search request, the electronic-mail attribute information is transmitted to the mobile 110. If the response switch 1301 is set to OFF, which means that the control unit 141 is not permitted to transmit the electronic-mail attribute information to the mobile 110. Thus, when the control unit 141 of the printing device 140 receives the print-service search request, the electronic-mail attribute information is not transmitted to the mobile 110.

If the mobile 110 transmits the print-service search request to the printing device 140 while the response switch 1301 is set to ON, the print-service search response including the electronic-mail attribute information is returned and the printing device 140 corresponding to the response is displayed on the display unit 115 of the mobile 110. Therefore, the user can select a desired printing device 140 displayed on the display unit 115 and the transmission of the electronic data to the server 120 is executed.

The response switch 1301 is automatically set to OFF after a certain time period elapses since the response switch 1301 is set to ON. More specifically, after the certain time period elapses since the setting for permitting the transmission of the electronic-mail attribute information is performed, the response switch 1301 changes the setting to the one that the transmission of the electronic-mail attribute information is not permitted.

In the present exemplary embodiment described above, only the printing device 140 whose response switch 1301 is set to ON by the user is displayed on the display unit 115, so that the user can easily identify the desired printing device 140, and a troublesome task for the user to select the desired printing device 140 can be reduced.

The present exemplary embodiment may be realized by being combined with each of the second exemplary embodiment and the third exemplary embodiment, or both of the second exemplary embodiment and the third exemplary embodiment.

According to the first exemplary embodiment, the mobile 110 is configured to transmit electronic data to be printed to the server 120 using the electronic mail. In a fifth exemplary embodiment, a configuration is described below in which a mobile 110 does not transmit electronic data to a server 120, but a printing device 140 transmits the electronic data attached to electronic mail.

According to the present exemplary embodiment, the mobile 110 directly and merely transmits electronic data to be printed to the printing device 140 via the network, thus the load of processes executed by the mobile 110 can be reduced. Further, according to the present exemplary embodiment, the mobile 110 also transmits the print-service search request to the network to search for the printing device 140 and displays the searched printing device 140 on the display unit 115 as illustrated in FIG. 4B.

The present exemplary embodiment, however, is different from the first exemplary embodiment in that the mobile 110 selectably displays the printing device 140 which transmits the response irrespective of whether the electronic-mail attribute information exists or not in the print-service search response transmitted by the printing device 140. The user selects the printing device 140 on the selection screen illustrated in FIG. 4B and the mobile 110 transmits the electronic data to the printing device 140. In the transmission of the electronic data, the mobile 110 directly transmits the electronic data to the printing device 140 by the means described in step S1103 in FIG. 11. Unless otherwise specified, the configuration of the present exemplary embodiment is similar to that of the first exemplary embodiment.

Figure 14:
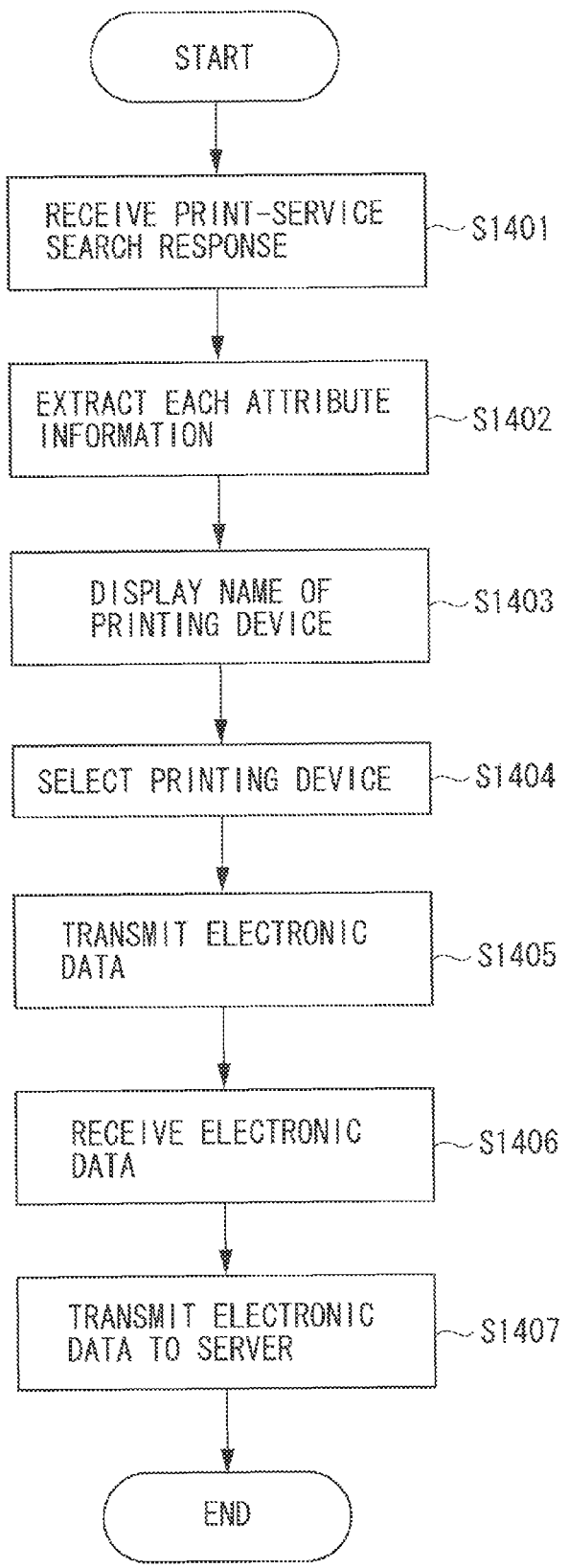
FIG. 14 is a flow chart illustrating a transmission and reception process of electronic data in a printing system according to a fifth exemplary embodiment.

The reception process of the print data in the printing device 140 according to the present exemplary embodiment is described in detail below with reference to FIG. 14. FIG. 14 is a flowchart illustrating the processes in which the printing device 140 transmits the electronic mail with the electronic data transmitted by the mobile 110 with the electronic data attached. These processes are executed by the control unit 111 of the mobile 110 and the control unit 141 of the printing device 140. According to the present exemplary embodiment, the control unit 141 has a function to transmit and receive electronic mail, thus can transmit the electronic mail to the server 120. The present exemplary embodiment can be realized by taking the process in step S203 described in FIG. 2 according to the first exemplary embodiment as a series of processes in the flow chart illustrated in FIG. 14 described below.

The processes in steps S1401 and S1402 are similar to those insteps S601 and S602 in FIG. 6 described in the first exemplary embodiment.

In step S1403, as is the case of step S603, the control unit 111 of the mobile 110 displays a list of the name of the printing device 140 transmitting the print-service search response received by the control unit 111 in step S1401 on the display unit 115 of the mobile 110.

In step S1404, as is the case of step S604, the control unit 111 of the mobile 110 selects the printing device 140 based on the user's selection instruction.

In step S1405, as is the case of step S605, the control unit 111 of the mobile 110 transmits the electronic data selected in step S301 in FIG. 3 to the selected the printing device 140.

In step S1406, the control unit 141 of the printing device 140 receives the electronic data from the mobile 110.

In step S1407, the control unit 141 of the printing device 140 attaches the received electronic data to the electronic mail to be sent to the electronic-mail address corresponding to the printing device 140 (i.e., the electronic-mail address allocated to the printing device 140 itself) and transmits the electronic mail. Thus, the electronic data is transmitted to the server 120. In the transmission process of the electronic data by the printing device 140, the printing device 140 previously stores the electronic-mail address allocated thereto and transmits the electronic mail using the electronic-mail address. The printing device 140 performs the reception process of print data described in FIG. 8, and receives the print data to perform printing.

According to the present exemplary embodiment described above, printing can be performed only by the mobile 110 directly transmitting the electronic data to the printing device 140, thus the electronic data of the mobile 110 can be simply printed.

According to the present exemplary embodiment, the electronic data is transmitted using the electronic mail in step S1407, however, the present invention is not limited to this configuration. In other words, the printing device 140 receiving the electronic data may transmit the electronic data using a method (hyper text transfer protocol (HTTP), for example) other than the electronic mail. In this case, the control unit 141 transmits information (the electronic-mail address corresponding to the printing device 140, for example) ensuring that the electronic data to be transmitted is printed by the printing device 140, which is a transmission source, by associating the information with the electronic data.

The present exemplary embodiment may be realized by combining with the configuration in which an interval of polling is shortened as in the case of the third exemplary embodiment or the configuration in which contents in the print-service search response are switched as in the case of the fourth exemplary embodiment. Alternatively, the present exemplary embodiment may be realized by combining with a combination of the configurations like the third and fourth exemplary embodiments.

A configuration in which the printing device 140 controls to whether to transmit electronic mail with print data attached according to a data format of electronic data received from the mobile 110 or to execute a printing process of the electronic data as it is by the printing device 140 in the fifth exemplary embodiment is described below as a sixth exemplary embodiment. Unless otherwise specified, the configuration of the sixth exemplary embodiment is similar to that of the fifth exemplary embodiment. The present exemplary embodiment can be realized by taking the process in step S1407 described in FIG. 14 according to the fifth exemplary embodiment as a series of processes in the flow chart illustrated in FIG. 15 described below.

Figure 15:
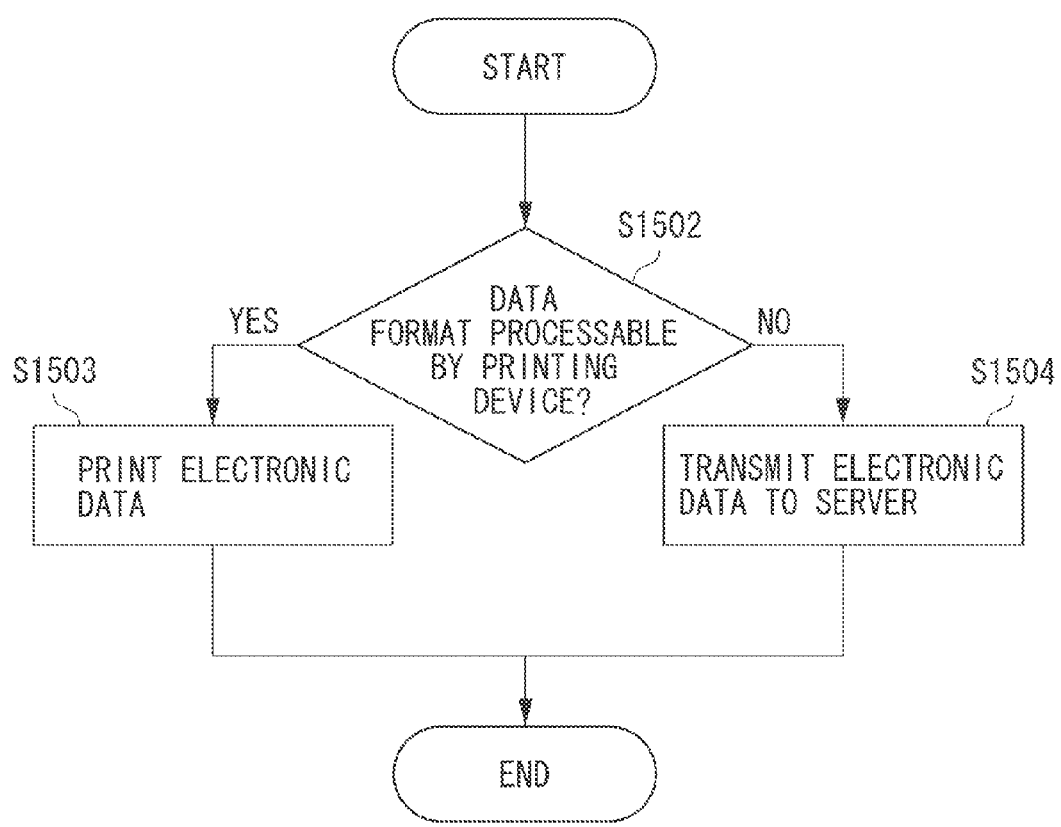
FIG. 15 is a flow chart illustrating a transmission and reception process of electronic data in a printing system according to a sixth exemplary embodiment.

The process for transmitting the electronic data in the printing device 140 according to the present exemplary embodiment is described in detail below with reference to FIG. 15. FIG. 15 is a flow chart illustrating the process executed by the control unit 141 in the printing device 140 according to the present exemplary embodiment.

In step S1502, the control unit 141 of the printing device 140 analyzes the electronic data received from the mobile 110 to determine whether the data format of the electronic data is the one that can be directly subjected to a printing process by the printing device 140.

If the control unit 141 determines that the data format can be subjected to the printing process by the printing device 140 (YES in step S1502), in step S1503, the control unit 141 of the printing device 140 executes the printing process of the electronic data.

If the control unit 141 determines that the data format cannot be subjected to the printing process by the printing device 140 (NO in step S1502), in step S1504, the control unit 141 of the printing device 140 transmits the electronic mail to which the electronic data received from the mobile 110 are attached. The electronic mail includes the electronic-mail address (i.e., the electronic-mail address allocated to the printing device 140 itself) corresponding to the printing device 140 as the destination.

Accordingly, the electronic data is transmitted to the server 120. In the transmission process of the electronic data by the printing device 140, the printing device 140 previously stores the electronic-mail address allocated thereto and transmits the electronic mail using the electronic-mail address. The printing device 140 performs the reception process of print data described in FIG. 8, and receives the print data to perform printing.

According to the present exemplary embodiment described above, printing can be performed only by the mobile 110 directly transmitting the electronic data to the printing device 140, thus the electronic data of the mobile 110 can be simply printed, as described in the fifth exemplary embodiment. In addition, according to the present exemplary embodiment, if the printing device 140 can directly print the electronic data received from the mobile 110, the printing device 140 can start printing without transmitting the electronic data to the server 120, so that high speed printing can be realized.

According to the present exemplary embodiment, the electronic data is transmitted using the electronic mail in step S1504, however, the present invention is not limited to this configuration. In other words, the printing device 140 receiving the electronic data may transmit the electronic data using a method (HTTP, for example) other than the electronic mail. In this case, the control unit 141 transmits information (the electronic-mail address corresponding to the printing device 140, for example) ensuring that the electronic data to be transmitted is printed by the printing device 140, which is a transmission source, by associating the information with the electronic data.

The present exemplary embodiment may be realized by combining with the configuration in which an interval of polling is shortened as in the case of the third exemplary embodiment or the configuration in which contents in the print-service search response are switched as in the case of the fourth exemplary embodiment. Alternatively, the present exemplary embodiment may be realized by combining with a combination of the configurations like the third and fourth exemplary embodiments.

According to the present exemplary embodiments described above, although the electronic-mail address corresponding to the printing device 140 is exemplified as information used by the mobile 110 to transmit an image to the printing device 140 via the server 120, the present invention is not limited to this configuration. For example, a key code for uniquely identifying the printing device 140 and the electronic-mail address corresponding to the server 120 may be included in the print-service search response. The mobile 110 has only to transmit the image (the electronic data) and the key code to the electronic-mail address corresponding to the server 120.

According to the present exemplary embodiments described above, the processes in each flow chart related to the present invention may be realized by each control unit of the mobile 110, the server 120, and the printing device 140 executing programs (computer programs) or by each control unit containing hardware circuits executing the programs.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-184619 filed Aug. 26, 2011, which is hereby incorporated by reference herein in its entirety.

What is claimed is:

1. A printing apparatus capable of communicating with an information processing apparatus and an image processing apparatus, the printing apparatus comprising:

a reception unit configured to receive a request for information of the printing apparatus from the information processing apparatus storing an image;

a setting unit configured to set whether to include predetermined information in a response to the received request, wherein the predetermined information is used for determining the printing apparatus to which the information processing apparatus transmits the stored image via the image processing apparatus;

a transmission unit configured to transmit the response including the predetermined information to the information processing apparatus in response to the received request, if the setting by the setting unit is a setting to include, in the response to the received request, the predetermined information; and a printing unit configured to acquire the image that the information processing apparatus has transmitted via the image processing apparatus based on the determination using the predetermined information, and to print the acquired image, wherein, after a certain time period has elapsed since the performing of the setting to include the predetermined information in the response to the received request, the setting unit changes the setting to a setting not to include, in the response to the received request, the predetermined information.

2. The printing apparatus according to claim 1, wherein the printing apparatus is connected with a local network with which the information processing apparatus is connected, and wherein the reception unit receives from the information processing apparatus the request transmitted to a group to which the printing apparatus belongs in the local network using a service search protocol.

3. The printing apparatus according to claim 1, wherein, if the image stored in the information processing apparatus is not an image in an image format processable by the printing apparatus, the printing unit acquires the image which is converted to an image format processable by the printing apparatus such that the image passes through the image processing apparatus and transmitted by the information processing apparatus using the predetermined information and prints the acquired image, and if the image stored in the information processing apparatus is an image in an image format processable by the printing apparatus, the printing unit acquires the image which the information processing apparatus transmits without using the predetermined information and not via the image processing apparatus and prints the acquired image.

4. The printing apparatus according to claim 3, wherein the predetermined information included in the response transmitted by the transmission unit includes information about an image format processable by the printing apparatus.

5. The printing apparatus according to claim 1, wherein the transmission unit transmits the response not including the predetermined information to the information processing apparatus in response to the received request if the setting unit does not perform the setting to include the predetermined information in the response to the received request.

6. The printing apparatus according to claim 1, wherein the predetermined information is an electronic mail address pre-assigned to the printing apparatus.

* * * * *